(12) United States Patent
Miyairi et al.

(10) Patent No.: US 12,116,920 B2
(45) Date of Patent: Oct. 15, 2024

(54) CATALYST SUPPORT AND INDUCTION HEATING CATALYST SYSTEM

(71) Applicant: NGK INSULATORS, LTD., Nagoya (JP)

(72) Inventors: Yukio Miyairi, Nagoya (JP); Masaaki Masuda, Nagoya (JP); Shuichi Ichikawa, Nagoya (JP); Takuya Ishihara, Tsushima (JP); Kai Matsumoto, Nagoya (JP); Norihisa Fujie, Kasugai (JP); Yoichi Aoki, Yatomi (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/402,804

(22) Filed: Jan. 3, 2024

(65) Prior Publication Data

US 2024/0133331 A1 Apr. 25, 2024

Related U.S. Application Data

(60) Division of application No. 18/168,762, filed on Feb. 14, 2023, which is a continuation of application No. PCT/JP2021/029765, filed on Aug. 12, 2021.

(30) Foreign Application Priority Data

Nov. 4, 2020 (JP) .................................. 2020-184566

(51) Int. Cl.
*F01N 3/28* (2006.01)
*B01J 35/33* (2024.01)
(Continued)

(52) U.S. Cl.
CPC ............ *F01N 3/2828* (2013.01); *B01J 35/33* (2024.01); *B01J 35/56* (2024.01); *F01N 3/2013* (2013.01);
(Continued)

(58) Field of Classification Search
CPC ...... B01D 2251/2062; B01D 2255/911; B01D 2258/012; B01D 53/9431; B01D 53/9495;
(Continued)

(56) References Cited

U.S. PATENT DOCUMENTS 5,260,538 A * 11/1993 Clary ................... B01J 8/1836
219/628
11,219,100 B2 * 1/2022 Takahashi .............. H05B 6/108
(Continued)

FOREIGN PATENT DOCUMENTS

CN 107288716 A * 10/2017 ............. F01N 3/027
CN 110359990 A * 10/2019 ......... B01D 46/0063
(Continued)

OTHER PUBLICATIONS

International Search Report and Written Opinion (Application No. PCT/JP2021/029765) dated Oct. 19, 2021.
(Continued)

*Primary Examiner* — Jesse S Bogue
(74) *Attorney, Agent, or Firm* — BURR PATENT LAW, PLLC

(57) ABSTRACT

A catalyst support for induction heating includes: a honeycomb structure including a pillar shaped honeycomb structure portion having: an outer peripheral wall; and a partition wall disposed on an inner side of the outer peripheral wall, the partition wall defining a plurality of cells, each of the cells extending from an end face on an inlet side to an end face on an outlet side in a gas flow direction to form a flow path; a catalyst supported onto an interior of the partition wall; and at least one magnetic body provided within the honeycomb structure, wherein the catalyst support has a region A where the catalyst is not supported, at least on the end face side of the catalyst support on the inlet side in the
(Continued)

gas flow direction, and wherein the magnetic body is arranged at least in the region A in the gas flow direction.

8 Claims, 9 Drawing Sheets

(51) Int. Cl.
  *B01J 35/56* (2024.01)
  *F01N 3/20* (2006.01)
(52) U.S. Cl.
  CPC ........ *F01N 3/2066* (2013.01); *F01N 2240/16* (2013.01); *F01N 2330/06* (2013.01); *F01N 2330/34* (2013.01); *F01N 2570/14* (2013.01)
(58) Field of Classification Search
  CPC .......... B01J 23/862; B01J 35/33; B01J 35/56; F01N 2240/16; F01N 2330/06; F01N 2330/34; F01N 2510/068; F01N 2570/14; F01N 2610/02; F01N 3/027; F01N 3/2006; F01N 3/2013; F01N 3/2066; F01N 3/24; F01N 3/28; F01N 3/2828; Y02T 10/12
  See application file for complete search history.

(56) References Cited

U.S. PATENT DOCUMENTS

| 2003/0175196 A1* | 9/2003 | Blackwell ............. B01J 19/087 423/376 |
| 2009/0196811 A1 | 8/2009 | Yamashita et al. |
| 2019/0323401 A1 | 10/2019 | Miyairi et al. |
| 2021/0115825 A1 | 4/2021 | Miyairi et al. |
| 2021/0291157 A1 | 9/2021 | Miyairi et al. |
| 2021/0293166 A1 | 9/2021 | Miyairi et al. |

FOREIGN PATENT DOCUMENTS

| DE | 112020004309 T5 * | 5/2022 | ............. B01D 39/20 |
| JP | 2007-132240 A | 5/2007 | |
| JP | 2007-313486 A | 12/2007 | |
| JP | 2019-188272 A | 10/2019 | |
| WO | 2020/031434 A1 | 2/2020 | |
| WO | 2020/110395 A1 | 6/2020 | |
| WO | 2020/110396 A1 | 6/2020 | |

OTHER PUBLICATIONS

English translation of the International Preliminary Report on Patentability (Chapter I) dated May 19, 2023 (Application No. PCT/JP2021/029765).

* cited by examiner

CATALYST SUPPORT AND INDUCTION HEATING CATALYST SYSTEM

CROSS REFERENCE TO RELATED APPLICATION

This application is a division of U.S. application Ser. No. 18/168,762, filed Feb. 14, 2023, which is a continuation of International Application No. PCT/JP2021/029765, filed Aug. 12, 2021, the entireties of which are incorporated herein by reference.

FIELD OF THE INVENTION

The present invention relates to a catalyst support, and an induction heating catalyst system.

BACKGROUND OF THE INVENTION

Exhaust gases from motor vehicles may typically contain harmful components such as carbon monoxide, hydrocarbons and nitrogen oxides or the like as a result of incomplete combustion. These harmful components are discharged in an increased amount during a period immediately after an engine is started, i.e., a period during which a catalyst temperature is lower and a catalytic activity is insufficient. Therefore, the harmful components in the exhaust gas may be discharged without being purified by the catalyst before reaching a catalyst activating temperature. In order to satisfy such a need, it is necessary to reduce emissions as much as possible, which are discharged without being purified by the catalyst before reaching the catalyst activating temperature. For example, measures using a heating technique of the catalyst support are known in the art.

Such a technique is known for an induction heating catalyst system for purifying an exhaust gas by providing a flow path for an exhaust gas from a motor vehicle with a catalyst support having magnetic bodies on a surfaces of a partition wall or in cells of a honeycomb structure, surrounding an outer circumference of the catalyst support by a coil, and heating the magnetic bodies by induction heating to cause the catalyst support to generate heat.

Patent Literature 1 describes a catalyst support having a structure in which metal particles or metal pieces are provided in a plurality of cells of a ceramic support over the entire cell, and the metal particles or metal pieces are allowed to generate heated by induction heating.

CITATION LIST

Patent Literatures

[Patent Literature 1] Japanese Patent Application Publication No. 2019-188272 A

SUMMARY OF THE INVENTION

The purpose of the induction heating is to increase a catalyst temperature to improve a purification rate when a gas temperature in the vicinity of an inlet of the catalyst support in a gas flow direction is still low. However, in the vicinity of the inlet of the catalyst support in the gas flow direction, the temperature of the gas and the temperature of the support/catalyst due to the induction heating are not sufficiently increased, and they gradually increase toward an outlet. At this time, in the technique described in Patent Literature 1, even if metal particles or metal pieces provided throughout the cells are caused to generate heat by induction heating, the temperature in the vicinity of the inlet in the gas flow direction of the catalyst support is not sufficiently increased. Therefore, it will be difficult to activate the catalyst provided in that region.

Thus, the catalyst provided in the vicinity of the inlet in the gas flow direction results in insufficient effective utilization, and in particular, when a noble metal such as Pt is used as the catalyst, there is a large demerit in terms of production cost.

In view of such circumstances, an object of the present invention is to provide a catalyst support and an induction heating catalyst system, which can effectively utilize a catalyst during induction heating.

The above problems are solved by the following invention. The present invention is specified as follows:

(1) A catalyst support for induction heating, comprising:
  a honeycomb structure comprising a pillar shaped honeycomb structure portion having: an outer peripheral wall; and a partition wall disposed on an inner side of the outer peripheral wall, the partition wall defining a plurality of cells, each of the cells extending from an end face on an inlet side to an end face on an outlet side in a gas flow direction to form a flow path;
  a catalyst supported onto an interior of the partition wall; and
  at least one magnetic body provided within the honeycomb structure,
  wherein the catalyst support has a region A where the catalyst is not supported, at least on the end face side of the catalyst support on the inlet side in the gas flow direction, and
  wherein the magnetic body is arranged at least in the region A in the gas flow direction.

(2) An induction heating catalyst system comprising: the catalyst support for induction heating according to (1); and a coil provided on an outer circumference of the catalyst support.

According to the present invention, it is possible to provide a catalyst support and an induction heating catalyst system, which can effectively utilize a catalyst during induction heating.

DETAILED DESCRIPTION OF THE INVENTION

Hereinafter, embodiments of a catalyst support and an induction heating catalyst system according to the present invention will be described with reference to the drawings. However, the present invention is not limited to these embodiments, and various changes, modifications, and improvements may be made based on knowledge of one of ordinary skill in the art, without departing from the scope of the present invention.

<Catalyst Support>

Figure 1:
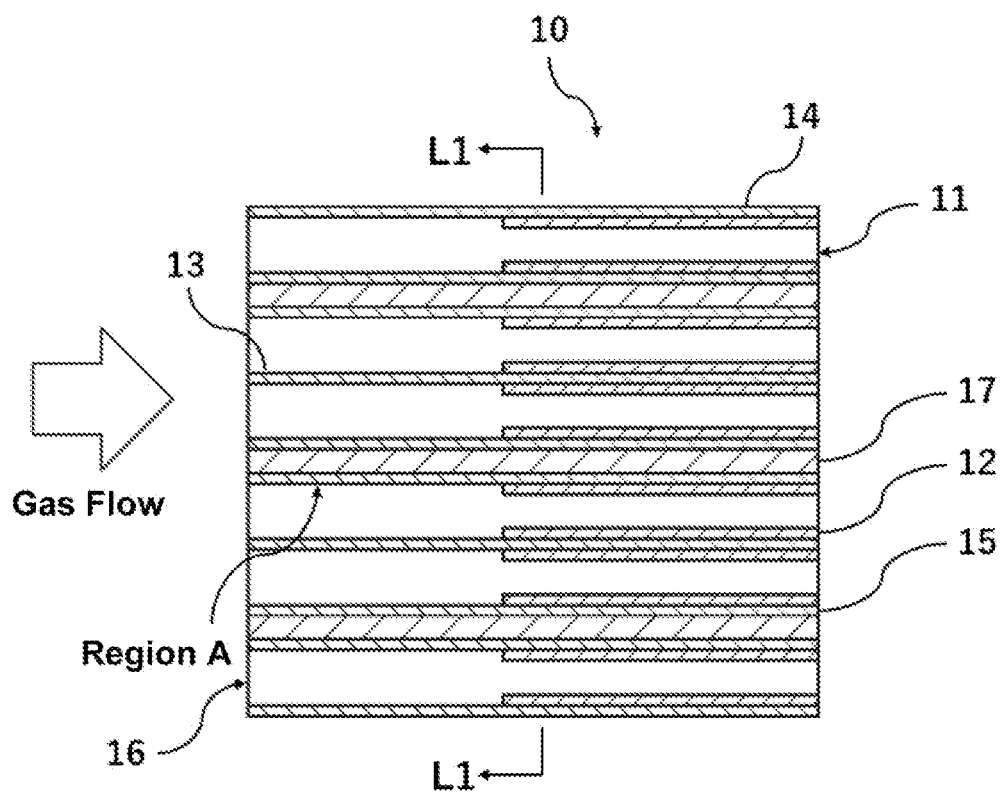
FIG. 1 is a schematic cross-sectional view of a catalyst support according to an embodiment of the present invention, which is parallel to an extending direction of cells.
Figure 2:
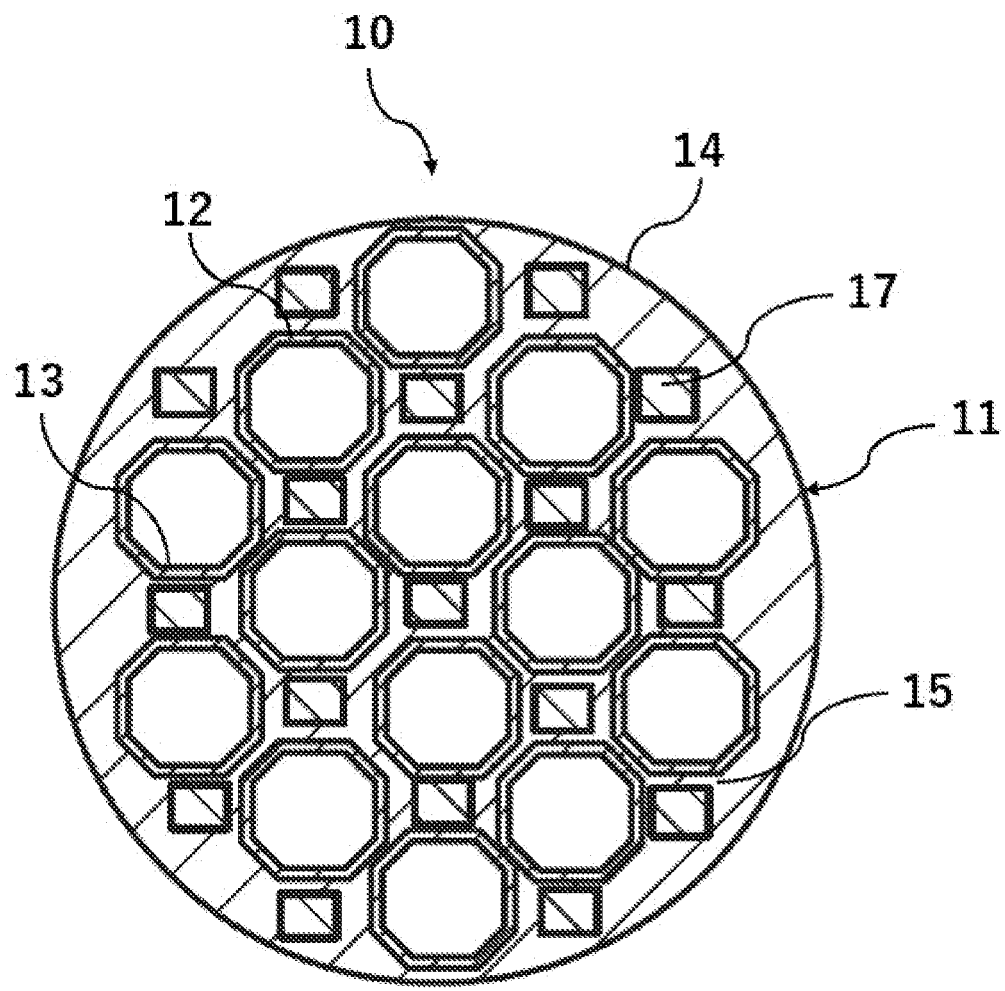
FIG. 2 is a schematic view of the L1-L1 cross section of the catalyst support in FIG. 1.

FIG. 1 is a schematic cross-sectional view of a catalyst support 10 according to an embodiment of the present invention, which is parallel to an extending direction of cells 13. FIG. 2 is a schematic view of the L1-L1 cross section of the catalyst support 10 in FIG. 1;

The catalyst support 10 includes: a honeycomb structure 11; a catalyst 12; and magnetic bodies 17. The honeycomb structure 11 of the catalyst support 10 includes a pillar shaped honeycomb structure portion 16 having: an outer peripheral wall 14; and a partition wall 15 which is arranged on an inner side of the outer peripheral wall 14, and which defines a plurality of cells 13 extending from an end face on an inlet side to an end face on an outlet side in a gas flow direction to form flow paths.

Although materials of the partition wall 15 and the outer peripheral wall 14 of the pillar shaped honeycomb structure portion 16 are not particularly limited, the pillar shaped honeycomb structure portion 16 is typically formed of a ceramic material. Examples of the ceramic material include cordierite, silicon carbide, aluminum titanate, silicon nitride, mullite, alumina, a silicon-silicon carbide-based composite material, or silicon carbide-cordierite-based composite material, in particular, a sintered body mainly based on a silicon-silicon carbide composite material or silicon carbide. As used herein, the expression "silicon carbide-based" means that the pillar shaped honeycomb structure portion 16 contains silicon carbide in an amount of 50% by mass or more of the entire pillar shaped honeycomb structure portion 16. The phrase "the pillar shaped honeycomb structure portion 16 is mainly based on a silicon-silicon carbide composite material" means that the pillar shaped honeycomb structure portion 16 contains 90% by mass or more of the silicon-silicon carbide composite material (total mass) based on the entire pillar shaped honeycomb structure portion 16. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the pillar shaped honeycomb structure portion 16 is mainly based on silicon carbide" means that the pillar shaped honeycomb structure portion 16 contains 90% by mass or more of silicon carbide (total mass) based on the entire pillar shaped honeycomb structure portion 16.

Preferably, the pillar shaped honeycomb structure portion 16 is formed of at least one ceramic material selected from the group consisting of cordierite, silicon carbide, aluminum titanate, silicon nitride, mullite, and alumina.

The shape of each of the cells of the pillar shaped honeycomb structure portion 16 may be preferably, but not particularly limited to, polygonal shape such as triangle, a quadrangle, a pentagon, a hexagon and an octagon; a circular shape; an ellipse shape; or irregular shapes, in a cross section orthogonal to the central axis of the pillar shaped honeycomb structure portion 16. The shape of the cell is preferably the polygonal shape.

The partition wall 15 of the pillar shaped honeycomb structure portion 16 preferably has a thickness of from 0.05 to 0.50 mm, and more preferably from 0.10 to 0.45 mm, in terms of ease of production. For example, the thickness of 0.05 mm or more improves the strength of the pillar shaped honeycomb structure portion 16. The thickness of 0.50 mm or less can reduce pressure loss. It should be noted that the thickness of the partition wall 15 is an average value measured by a method for observing the axial cross section with a microscope.

Further, the partition wall 15 preferably has a porosity of from 20 to 70%. In terms of ease of production, the porosity of the partition wall 15 is preferably 20% or more. The porosity of 70% or less can maintain the strength of the honeycomb structure 11.

The partition wall 15 preferably has an average pore diameter of from 2 to 30 µm, and more preferably from 5 to 25 µm. The average pore diameter of the partition wall 15 of 2 µm or more can lead to easy production. The average pore diameter of 30 µm or less can maintain the strength of the honeycomb structure 11. It should be noted that the terms "average pore diameter" and "porosity" as used herein mean an average pore diameter and a porosity measured by a mercury intrusion technique.

The pillar shaped honeycomb structure portion 16 preferably has a cell density in a range of from 5 to 150 cells/cm$^2$, and more preferably 5 to 100 cells/cm$^2$, and even more preferably in a range of from 31 to 80 cells/cm$^2$, although not particularly limited thereto.

An outer shape of the pillar shaped honeycomb structure portion 16 may be, but not particularly limited to, a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like.

Such a pillar shaped honeycomb structure portion 16 is produced by forming a green body containing a ceramic raw material into a honeycomb shape having the partition wall 15 that extends from one end face to other end face and defines a plurality of cells to form flow paths for a fluid, thereby forming a honeycomb formed body, and drying the honeycomb formed body and then firing it. When the resulting honeycomb structure is used for the honeycomb structure according to the present embodiment, the outer peripheral wall may be integrally extruded with the honeycomb structure, which is used as the outer peripheral wall as it is, or an outer circumference of the honeycomb structure may be ground and shaped into a predetermined shape after forming or firing it, and a coating material may be applied to the outer circumference-ground honeycomb structure to form an outer peripheral coating. In this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

The honeycomb structure 11 is not limited to an integral type honeycomb structure in which the partition wall is integrally formed. For example, the honeycomb structure 11 may be a honeycomb structure in which pillar shaped honeycomb segments each having a partition wall made of ceramics and a plurality of cells defined by the partition wall to form flow paths for a fluid are combined via joining material layers (joined honeycomb structure).

Within the partition wall 15, a catalyst 12 is supported. The catalyst 12 may employ at least one selected from the group consisting of an oxidation catalyst, a three-way catalyst, a $NO_x$ storage reduction catalyst, a $NO_x$ selective reduction catalyst (SCR catalyst), a hydrocarbon adsorption catalyst, hydrocarbon, a carbon monoxide oxidation catalyst, and an ammonia slip (oxidation) catalyst.

The catalyst 12 can be appropriately selected depending on the desired purpose of exhaust gas purification. The method for supporting the catalyst 12 is not particularly limited, and it can be carried out according to a conventional method for supporting a catalyst on a honeycomb structure.

The catalyst support 10 has a region A where the catalyst 12 is not supported, at least on the end face side on an inlet side in a gas flow direction. The end face of the catalyst support 10 on the inlet side in the gas flow direction is in a lower temperature region than the end face on the outlet side, and the catalyst 12 is difficult to reach a sufficient activation temperature. Therefore, the lower temperature region is the region A where the catalyst 12 is not supported, whereby the catalyst 12 can be effectively utilized without waste during induction heating, resulting in improved production cost. In particular, when a noble metal such as Pt is used as the catalyst 12, there is a large merit in terms of the production cost.

There is a prior art in which an electrically heating support (EHC) is arranged upstream of the gas flow direction of the catalyst support, but in this art, the catalyst support is heated only through a gas heated by the EHC provided upstream of the gas flow direction. Therefore, there is no path for transferring electric heating energy by heat conduction between solids, and there is an insufficient temperature increase in the vicinity of the inlet of the catalyst support in the gas flow direction, in particular, which will make effective utilization of the catalyst difficult. Even with respect to such a problem, the catalyst support 10 according to the present invention has the region A where the catalyst 12 is not supported at least on the end face side on the inlet side in the gas flow direction, so that the catalyst 12 is not supported in a region where an increase in a temperature in the vicinity of the inlet in the gas flow direction of the catalyst support is insufficient, and the catalyst 12 can be effectively utilized without waste during induction heating.

Further, when the catalyst support 10 is of a type that purifies an exhaust gas using $NH_3$ as a reducing agent, the catalyst support 10 has the SCR catalyst. Since the SCR catalyst has a property of adsorbing $NH_3$, the $NH_3$ is adsorbed in the lower temperature region in the vicinity of the inlet in the gas flow direction of the catalyst support 10, and the $NH_3$ does not sufficiently reach the outlet side, which will cause a problem that a decrease in exhaust gas purification performance. On the other hand, the catalyst support 10 according to the embodiment of the present invention has the region A where the SCR catalyst is not supported at least on the end face side on the inlet side in the gas flow direction, so that the adsorption of $NH_3$ on the inlet side can be satisfactorily suppressed, and deterioration of the exhaust gas purification performance can be suppressed.

The region A is preferably arranged from the end face of the catalyst support 10 on the inlet side in the gas flow direction to a position of 10% to 70% of the length of the catalyst support 10. The catalyst 12 may not reach the activation temperature sufficiently from the end face of the catalyst support 10 on the inlet side in the gas flow direction to a position of 10% to 70% of the length of the catalyst support 10. By arranging the region A where the catalyst 12 is not supported to that position, the catalyst 12 can be effectively utilized without waste. The region A is more preferably arranged from the end face of the catalyst support 10 on the inlet side in the gas flow direction to a position of 10% to 50% of the length of the catalyst support 10, and even more preferably arranged to a position of 10% to 30% of the length of the catalyst support 10.

At least one magnetic body 17 is provided in the honeycomb structure 11. The magnetic body 17 is arranged at least in the region A as described above in the gas flow direction of the catalyst support 10. By arranging the magnetic body 17 in the region A, the vicinity of the inlet in the gas flow direction of the catalyst support 10 can be heated. Therefore, the exhaust gas purification performance of the catalyst support 10 can be improved.

The magnetic bodies 17 may be filled in the cells 13 of the honeycomb structure 11 as shown in FIG. 1. In this case, in the catalyst support 10, the cells filled with the magnetic bodies 17 and the cells on which the catalyst 12 is supported have different structures.

With respect to the cells vertically and horizontally adjacent to each other, the cells 15 filled with the magnetic bodies 17 may be arranged at intervals of one cell to form a staggered pattern, or may be arranged at intervals of a plurality of cells such as two cells and three cells, or may be continuously arranged. The number, arrangement, and the like of the cells filled with the magnetic bodies 17 (hereinafter, also referred to as magnetic body-filled cells) are not limited, and they may be appropriately designed as needed. In the vicinity of the outer peripheral wall 14 of the honeycomb structure 11, a distance between the magnetic body-filled cells may be increased to decrease the density of the magnetic body-filled cells, and in the central portion of the honeycomb structure 11, the distance between the magnetic body-filled cells may be decreased. Such a distance between the magnetic body-filled cells can allow an influence of a magnetic field of a coil to reach the central portion of the honeycomb structure 11 without being blocked by the magnetic bodies in the vicinity of the outer circumference, which is preferable. Further, the length of the portion to be filled with the magnetic bodies of the magnetic body-filled cells does not need to be constant, and when the length is shorter in the vicinity of the outer peripheral wall 14 and longer in the central portion, the influence of the magnetic field of the coil sufficiently reaches the interior of the honeycomb structure, which is preferable. If the length of the portion to be filled with the magnetic bodies differs depending on the cells, the region A is defined by an average length of the filled magnetic bodies. From the viewpoint of enhancing the heating effect, it is better to increase the number of the cells filled with the magnetic bodies 17, but from the viewpoint of reducing the pressure loss, it is better to reduce it as much as possible. Further, as shown in FIG. 2, when the honeycomb structure 11 has cells with a small cross-sectional area and cells with a large cross-sectional area, an embodiment where the cells with a small cross-sectional area are filled with the magnetic bodies 17, and the cells with a large cross-sectional area are not provided with the magnetic bodies 17 is preferable from the viewpoint of reducing the pressure loss while maintaining the heating performance of the induction heating.

The magnetic body 17 is a magnetic material, and is magnetized by a magnetic field, and has a state of magnetization variable depending on the intensity of the magnetic field. This is represented by a "magnetization curve". The magnetization curve may have a magnetic field H on a horizontal axis and a magnetic flux density B on a vertical axis (B-H curve). A state where no magnetic field is applied to the magnetic material refers to a degaussing state, which is represented by an origin O. As a magnetic field is applied, a curve in which the magnetic flux density increases from the origin O to a saturated state is drawn. The curve is an "initial magnetization curve". A slope of a straight line connecting a point on the initial magnetization curve to the origin is a "magnetic permeability". The magnetic permeability indicates an ease of magnetization of the magnetic material in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

The magnetic body 17 preferably has a maximum magnetic permeability of 500 or more. According to such a configuration, when the honeycomb structure 11 is subjected to the dielectric heating, the temperature can be raised in a short period of time until a temperature at which the catalyst 12 is activated (about 300° C.).

The magnetic body 17 preferably has a Curie temperature of 450° C. or more. The Curie temperature refers to a temperature at which the characteristic of the ferromagnetism is lost. Also, the magnetic body 17 preferably has an intrinsic resistance value of 20 μΩcm or more at 25° C. Also, the magnetic body 17 preferably has a coercive force of 40 A/m or more. According to such configurations, the temperature can be raised in a short period of time until a temperature at which the catalyst 12 is activated (about 300° C.).

Types of the magnetic bodies 17 include, for example, balance Co-20% by mass of Fe; balance Co-25% by mass of Ni-4% by mass of Fe; balance Fe-15 to 35% by mass of Co; balance Fe-17% by mass of Co-2% by mass of Cr-1% by mass of Mo; balance Fe-49% by mass of Co-2% by mass of V; balance Fe-18% by mass of Co-10% by mass of Cr-2% by mass of Mo-1% by mass of Al; balance Fe-27% by mass of Co-1% by mass of Nb; balance Fe-20% by mass of Co-1% by mass of Cr-2% by mass of V; balance Fe-35% by mass of Co-1% by mass of Cr; pure cobalt; pure iron; electromagnetic soft iron; balance Fe-0.1 to 0.5% by mass of Mn; balance Fe-3% by mass of Si; balance Fe-6.5% by mass of Si; balance Fe-18% by mass of Cr; balance Fe-16% by mass of Cr-8% by mass of Al; balance Ni-13% by mass of Fe-5.3% by mass of Mo; balance Fe-45% by mass of Ni; balance Fe-10% by mass of Si-5% by mass of Al; balance Fe-36% by mass of Ni; balance Fe-45% by mass of Ni; balance Fe-35% by mass of Cr; balance Fe-13% by mass of Cr-2% by mass of Si; balance Fe-20% by mass of Cr-2% by mass of Si-2% by mass of Mo; balance Fe-20% by mass of Co-1% by mass of V; balance Fe-13% by mass of Cr-2% by mass of Si; balance Fe-17% by mass of Co-2% by mass of Cr-1% by mass of Mo; and the like.

The magnetic body 17 can be plate-shaped, rod-shaped, ring-shaped, wire-shaped, or fiber-shaped, for example. In the present invention, the rod-shaped magnetic bodies and the wire-shaped magnetic bodies are distinguished by defining those having a cross-sectional diameter of 0.8 mm or more perpendicular to the length direction as the rod-shaped ones, and defining those having a diameter of less than 0.8 mm as the wired-shaped ones. When filling the cells 13 with the magnetic bodies 17, the magnetic bodies having these shapes can be appropriately used according to the shape of the cells 13. A single cell may be filled with a plurality of magnetic bodies 17 or may be filled with only one.

When the magnetic body 17 is ring-shaped, a groove(s) is/are provided in the end face of the catalyst support 10 on the inlet side in the gas flow direction, and the ring-shaped magnetic body(s) is embedded in the groove(s). According to such a structure, an electric current will easily flow so as to circulate the ring-shaped magnetic body 17 by electromagnetic induction heating, and an eddy current will be easily generated. Therefore, electromagnetic induction heating is sufficiently possible even at a relatively low frequency of several tens of kHz or less. Further, since eddy currents are easily generated by the ring-shaped magnetic body 17, there is no limitation due to the Curie point of the material, such as the need to always use a ferromagnetic material for the magnetic body, resulting in good heating rate of the catalyst support 10.

The number of the ring-shaped magnetic bodies 17 provided on the end face of the catalyst support 10 on the inlet side in the gas flow direction is also not particularly limited. For example, a plurality of single ring-shaped magnetic bodies may be provided on the end face of the catalyst support 10, spaced apart from each other.

The cells 13 may be filled with a composite composition of the magnetic body and a binding material or an adhesive material. Examples of the binding material include materials mainly based on a metal or glass. Examples of the adhesive material include materials mainly based on silica or alumina. In addition to the binding material or the adhesive material, they may further contain organic or inorganic substances.

Figure 3:
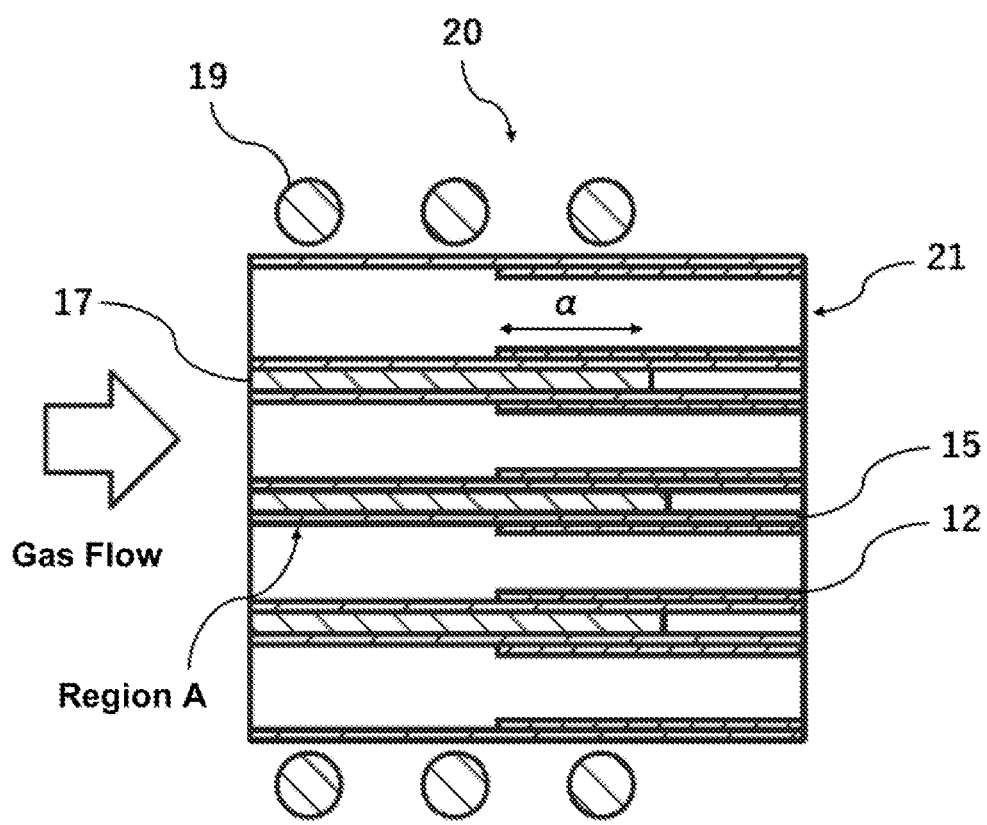
FIG. 3 is a schematic cross-sectional view of a catalyst support according to an embodiment of the present invention, which is parallel to an extending direction of cells.
Figure 4:
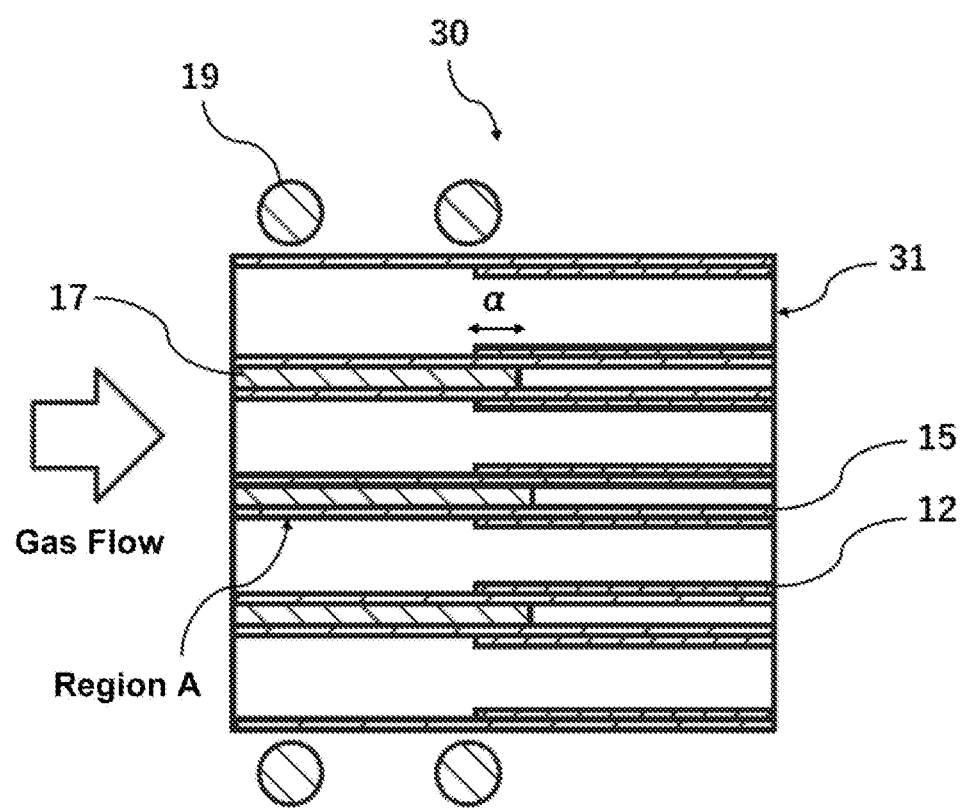
FIG. 4 is a schematic cross-sectional view of a catalyst support according to an embodiment of the present invention, which is parallel to an extending direction of cells.

As shown in FIG. 1, the magnetic bodies 17 filled in the cells 13 may be filled from the end face on the inlet side in the gas flow direction to the end face on the outlet side of the catalyst support 10. Alternatively, as shown in FIG. 3 or 4, the magnetic bodies 17 may be filled from the end face on the inlet side in the gas flow direction of the catalyst support 10 to the partway of the cells 13. In this case, the coil 19 arranged so as to surround circumferentially the outer side of the catalyst support 10 is provided at the position corresponding to the region filled with the magnetic bodies 17. When the magnetic bodies 17 are filled from the end face on the inlet side in the gas flow direction of the catalyst support 10 to the partway of the cells 14, as shown in FIG. 3 or 4, it is preferable to have a portion a where the region supporting the catalyst 12 and the region filled with the magnetic bodies 17 overlap with each other, in the gas flow direction of the catalyst support 20, 30. According to such an arrangement, the heat from the magnetic bodies generated by induction heating is well transmitted to the catalyst 12, so that the catalyst 12 can be more effectively heated. A larger portion a where the region supporting the catalyst 12 and the region filled with the magnetic bodies overlap with each other can lead to better heating of the catalyst 12. From such a point of view, the length of the overlapping portion a is preferably 10% or more, more preferably 20% or more, most preferably 100%, of the region supporting the catalyst 12 of the cells 13, in the gas flow direction of the catalyst support 10.

Figure 5:
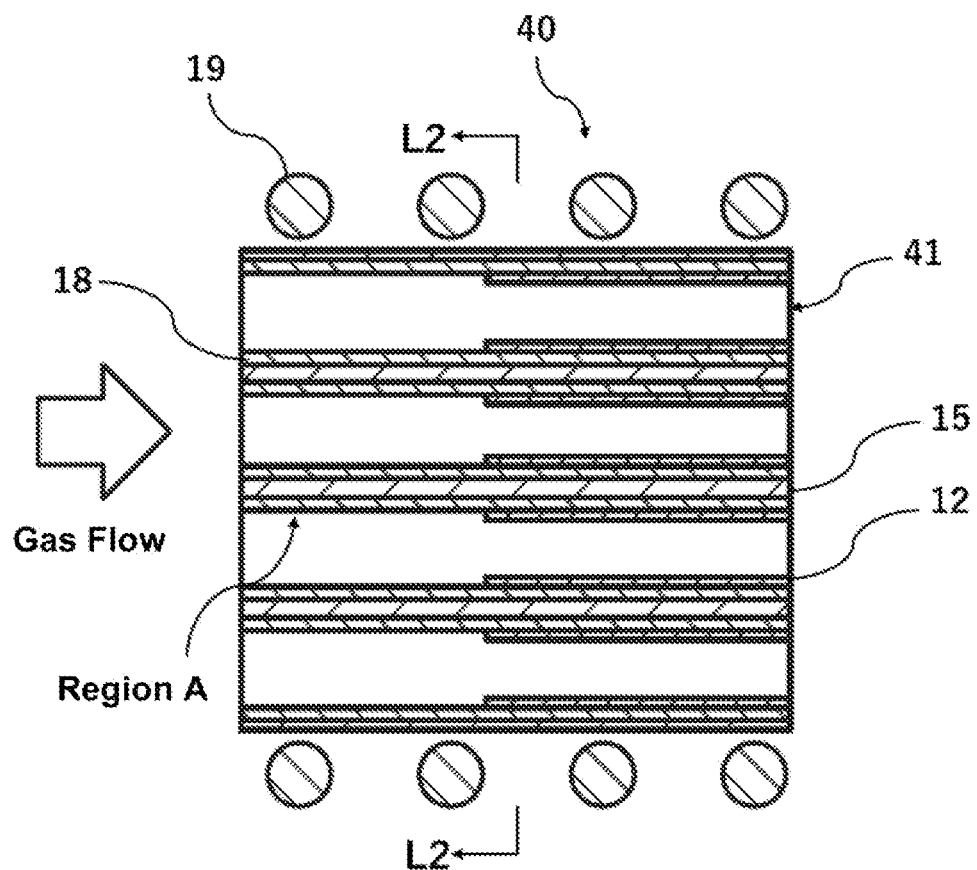
FIG. 5 is a schematic cross-sectional view of a catalyst support according to an embodiment of the present invention, which is parallel to an extending direction of cells.
Figure 6:
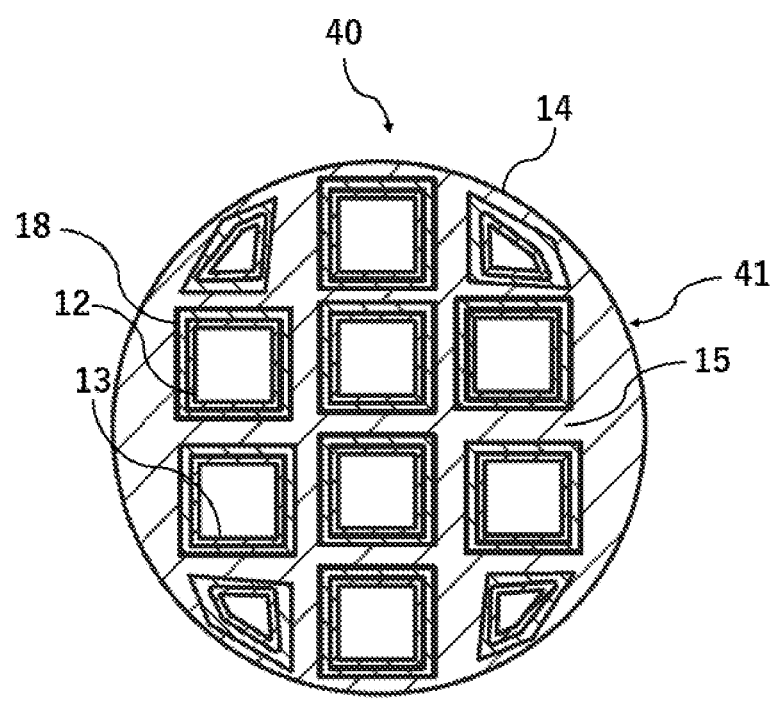
FIG. 6 is a schematic view of the L2-L2 cross section of the catalyst support in FIG. 5.

As shown in FIG. 5 and FIG. 6 which is a schematic view of a L2-L2 cross section of a catalyst support 40 illustrated in FIG. 5, the magnetic bodies may be contained in a surface layer 18 provided on a partition wall 15 of a honeycomb structure 41. The surface layer 18 contains a fixing material in which magnetic powder is dispersed. Examples of the fixing material that can be used herein include glass containing a silicate, borate or borosilicate, crystallized glass, ceramics, or glass, crystallized glass, ceramics, containing other oxides, or the like. Preferable examples of the glass that can be used herein include a high-melting point glass having a melting point of 900 to 1100° C. The use of the high-melting point glass results in improvement of heat resistance of the surface layer 18.

The surface layer 18 preferably has a thickness of 10 to 100 μm. The thickness of the surface layer 18 of 10 μm or more can allow a larger amount of magnetic substances to be contained, thereby increasing an efficiency of heat generation by induction heating. The thickness of the surface layer 18 of 100 μm or less can lead to reduced pressure loss.

The honeycomb structure 41 may have a structure in which both end faces are alternately plugged, in which case the gas passes through the partition wall 15. In this case, the surface layer 18 preferably has a porosity of 30 to 70%. The porosity of the surface layer 18 of 30% or more can allow the cells 13 provided with the surface layer 18 to be satisfactorily used as flow paths for an exhaust gas. The porosity of the surface layer 18 of 70% or less can lead to improved induction heating performance of the catalyst support 10. The porosity of the surface layer 18 is more preferably 35 to 65%, and even more preferably 40 to 60%. It is difficult to measure the porosity of the surface layer 18 by the mercury intrusion technique in terms of sample cutting, and so in this case, it can be measured by image analysis. In the case of the honeycomb structure in which the cells penetrate from the inlet to the outlet, the surface layer 18 preferably has a porosity of 10% or more and 40% or less. The porosity of 10% or more can allow a water content of a catalyst slurry to be easily absorbed and a catalyst coating property to be improved. The porosity of 40% or less can maintain the strength even if the partition wall has a lower thickness. The porosity of the surface layer 18 is more preferably 20% or more and 35% or less.

With respect to the cells adjacent vertically and horizontally, the cells 13 in which the surface layer 18 containing the magnetic bodies is provided on the partition wall 15 may be arranged at an interval of one cell to form a staggered pattern, or may be arranged at intervals of a plurality of cells such as two cells and three cells, or may be continuously arranged. The number, arrangement, and the like of the cells in which the surface layer 18 containing the magnetic bodies is provided on the partition wall 15 are not limited, and they may be appropriately designed as necessary. From the viewpoint of enhancing the heating effect, it is better to increase the number of the cells in which the surface layer 18 containing the magnetic bodies is provided on the partition wall 15, while from the viewpoint of lowering the pressure loss, it is better to reduce the number of the cells as much as possible.

As shown in FIG. 5, the surface layer 18 containing the magnetic bodies provided on the partition wall 15 may be provided over the entire area from the end face on the inlet side to the end face on the outlet side in the gas flow direction of the catalyst support 40. Further, as shown in FIG. 7, the catalyst support 50 may be provided from the end face on the inlet side in the gas flow direction of the catalyst support 50 to the partway of the cells 13.

Figure 7:
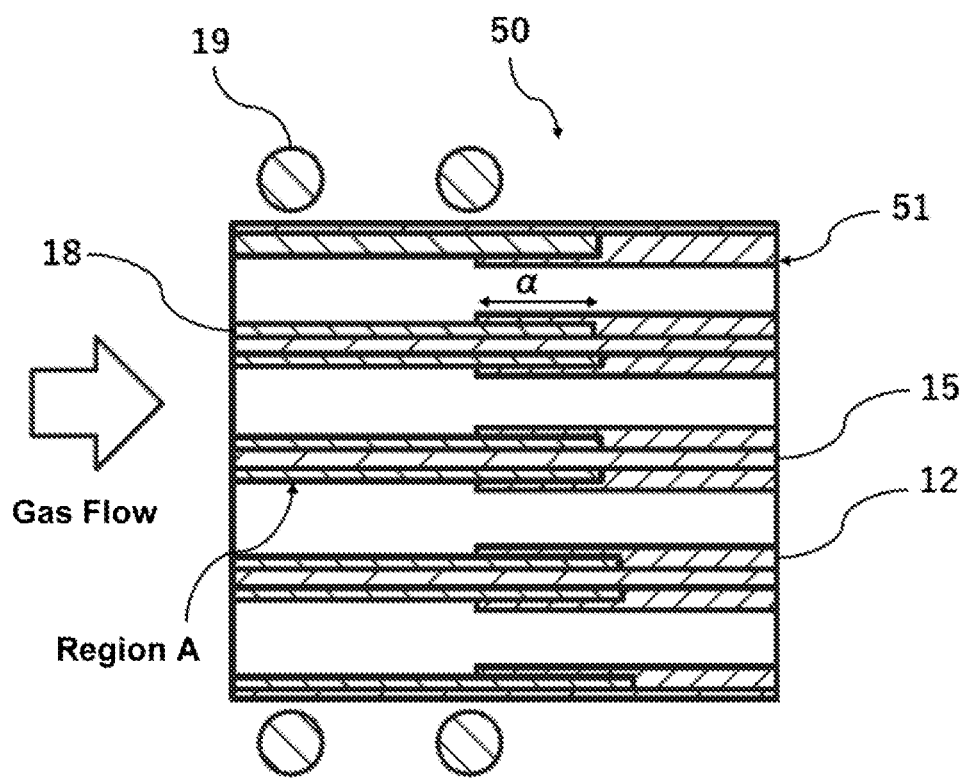
FIG. 7 is a schematic cross-sectional view of a catalyst support according to an embodiment of the present invention, which is parallel to an extending direction of cells.

When the surface layer 18 containing the magnetic bodies provided on the partition wall 15 is provided from the end face on the inlet side in the gas flow direction of the catalyst support to the partway of the cells 13, as shown in FIG. 7, it is preferable to have a portion a where the region provided with the catalyst 12 and the region provided with the surface layer 18 containing the magnetic bodies overlap with each other, in the gas flow direction of the catalyst support 50. According to such an arrangement, the heat from the magnetic bodies generated by induction heating is well transmitted to the catalyst 12, so that the catalyst 12 can be more effectively heated. A larger portion a where the region provided with the catalyst 12 and the region provided with the surface layer 18 containing the magnetic bodies overlap with each other can lead to better heating of the catalyst 12. From such a point of view, the length of the overlapping portion a is preferably 10% or more, more preferably 15% or more, and even more preferably 20%, of the region supporting the catalyst 12 of the cells 13, in the gas flow direction of the catalyst support. The upper limit is not particularly limited, but it may be 100% or less.

The magnetic body may be formed by dispersing magnetic powder. The magnetic powder may be dispersedly contained in the surface layer 18 as described above, or may be directly dispersedly supported on the partition wall 15 of the honeycomb structure 11. The magnetic powder may have an average particle diameter of 10 to 200 μm. Moreover, the dispersibility of the magnetic powder may be non-uniform.

<Method for Producing Catalyst Support>

Next, the method for producing the catalyst support according to the embodiment of the present invention will be described. First, the honeycomb structure having the partition wall made of ceramics and the plurality of cells defined by the partition walls is produced. For example, when producing the honeycomb structure made of cordierite, a cordierite-forming raw material is firstly prepared as a green body. The cordierite-forming raw material contains a silica source component, a magnesia source component, and an alumina source component, and the like, in order to formulate each component so as to have a theoretical composition of cordierite crystal. Among them, the silica source component that can be used herein includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used herein includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used herein include at least one metal selected from the group consisting of iron, copper, zinc, lead, aluminum, and nickel, alloys mainly based on those metals (e.g., carbon steel and cast iron for the iron, and stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a confetti shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

The magnetic bodies are provided on the honeycomb dried body. Here, each production step for various forms of magnetic bodies will be described.

(1) Case where the magnetic body is magnetic powder contained in the surface layer and the surface layer is provided on the partition wall of the cells.

First, a surface layer forming slurry is prepared from a material obtained by mixing the magnetic powder with the fixing material made of glass or the like. More particularly, for example, magnetic powder and glass powder are blended, and a binder, dispersant, and water are blended therein to prepare the surface layer forming slurry. The blending ratio of the magnetic powder to the glass powder is 1:1 or more and 20:1 or less on a volume basis.

Subsequently, a mask is applied onto some of the cells on one end face on an upstream side of the honeycomb dried body, and that end face is immersed in a storage container in which the surface layer forming slurry is stored to coat the non-masked cells with the surface layer forming slurry. In this case, the surface layer forming slurry is applied to the interior of the cells in a region of a predetermined length from one end face of the honeycomb dried body. It is then dried to remove water in the surface layer forming slurry, thereby forming a surface layer on the partition wall of the cells. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used. It should be noted that when the surface layer is formed on all the cells of the honeycomb structure, the surface layer-forming slurry may be applied to the cells without applying the mask onto the end face on the upstream side.

A method of filling the slurry in the cells is simply carried out by pushing a paste-like material into the cells with a spatula such as a squeegee. It is easy to control the depth by the number of squeegee processes to be pushed.

(2) Case where the magnetic body is a magnetic powder and is filled in the cells in a state of being contained in a binding material or an adhesive material.

A slurry including the magnetic powder and the binder containing metal or glass as a main component is poured into the cells of the honeycomb dried body and solidified by heating it at a temperature equal to or higher than a melting point of the metal or a softening point of the glass. Alternatively, a slurry including magnetic powder and an adhesive material containing silica or alumina as a main component is poured into the cells of the honeycomb dried body and heated to solidify the silica or alumina.

When using the binding material containing metal or glass as a main component, it is necessary to melt or soften the honeycomb dried body once at a temperature lower than a heat resistance temperature of the honeycomb dried body, and so it is preferable to heat it at a temperature higher than or equal to a melting point or a softening point of the binding material. Also, depending on use environments, the maximum temperature may reach about 700° C., and so it is more preferable to use a metal or glass having a melting point or softening point higher than or equal to that temperature. A specific melting point or softening point is, for example, 800 to 1200° C. On the other hand, when using the adhesive material containing silica or alumina as a main component, it is preferable that the adhesive material can be solidified by heating and drying during production. The adhesive material that can be solidified by heating and drying includes, for example, a colloidal dispersion of silica or alumina, or may be a colloidal dispersion containing silica and alumina. Further, since the maximum temperature in the usage environment reaches about 700° C., it is more preferable to use silica or alumina having a heat resistance temperature higher than or equal to that temperature. After the slurry is poured into the cells of the honeycomb dried body, a suction jig is attached to a downstream side of the honeycomb dried body, the excess water is removed by suction from the other end face side downstream of the honeycomb dried body, and the material containing the magnetic bodies is filled. As for the conditions for the heat treatment of the material containing the magnetic bodies, it is preferable to heat the material at a temperature of 800 to 1200° C. for 0.5 to 3 hours.

When using the adhesive material containing alumina or silica as a main component, the step of pouring the slurry into the cells may be performed at the stage of the honeycomb formed body or the honeycomb dried body. In this case, after the slurry is poured into the cells of the honeycomb formed body, the honeycomb formed body is dried, and in the step of firing the honeycomb dried body, the step of fixing the magnetic bodies to the adhesive material is simultaneously performed. The silica or alumina preferably exerts the effect of being solidified by drying.

(3) Case where the magnetic body has a plate shape, rod shape, ring shape, wire shape, or fiber shape and is filled in the cells.

First, a magnetic body having a predetermined plate shape, rod shape, wire shape or fiber shape is prepared in consideration of the cross-sectional shape of the cells of the honeycomb dried body to be filled with the magnetic body and the length of the cells. The cells are then filled with the magnetic bodies by inserting the magnetic bodies into the predetermined cells of the honeycomb dried body from the end face on the upstream side to a predetermined length. When the magnetic body is ring-shaped, the end face on the upstream side of the honeycomb dried body is cut to a predetermined depth to form grooves, and the ring-shaped magnetic bodies are inserted into the grooves. Alternatively, a raw honeycomb formed body having grooves formed is prepared and dried to produce a honeycomb dried body, and the ring-shaped magnetic bodies are then inserted into the grooves.

After providing the magnetic bodies, the catalyst is supported on the predetermined cells of the honeycomb dried body. The method for supporting the catalyst is not particularly limited, and it may be carried out according to the method for supporting the catalyst carried out in the conventional method for producing the catalyst support. The catalyst support according to the embodiment of the present invention can be thus produced.

<Induction Heating Catalyst System>

Figure 8:
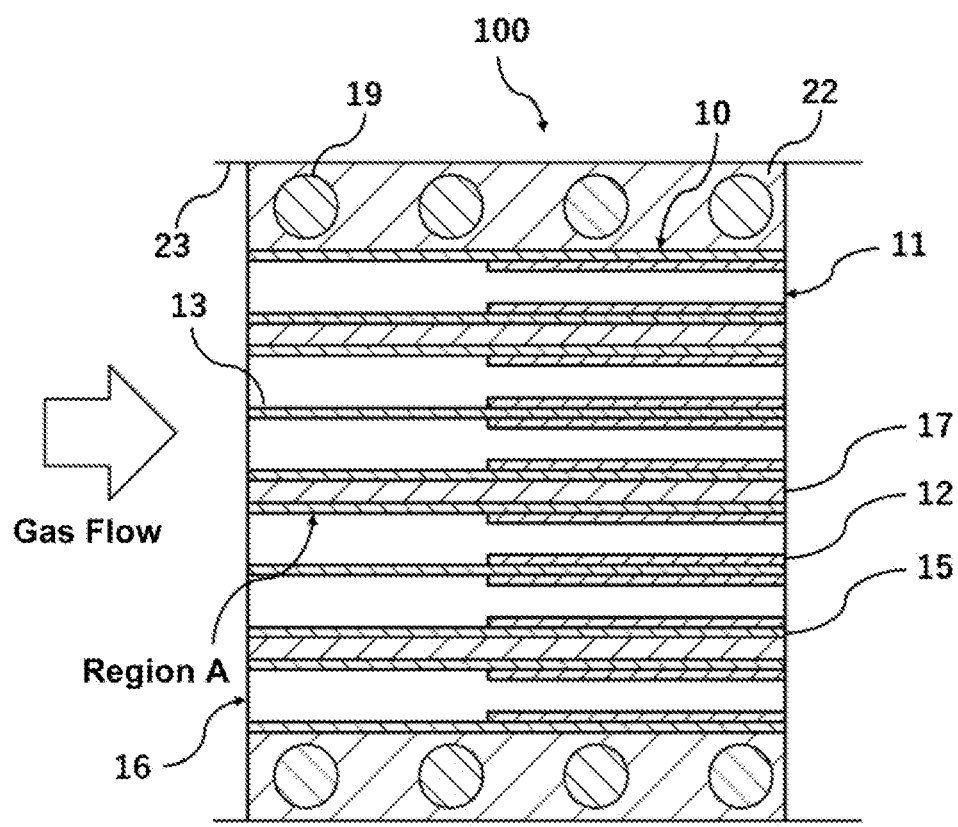
FIG. 8 is a schematic cross-sectional view of an induction heating catalyst system according to an embodiment of the present invention, which is parallel to a gas flow direction.

FIG. 8 shows a schematic cross-sectional view of an induction heating catalyst system 100 according to an embodiment of the present invention, which is parallel to a gas flow direction. The induction heating catalyst system 100 has the catalyst support 10 according to the embodiment of the present invention and a coil 19 provided around the outer circumference of the catalyst support 10.

The coil 19 spirally surrounds the outer circumference of the catalyst support. The coil 19 can be provided at a position corresponding to the region provided with the magnetic bodies in the gas flow direction of the catalyst support. For example, in each of the catalyst supports shown in FIGS. 3, 4, and 7, the coil 19 is arranged so as to correspond only to the region provided with the magnetic bodies in the gas flow direction of the catalyst support. This can result in an improved heating efficiency of the catalyst support, and can allow the induction heating catalyst system 100 to be simplified. The induction heating catalyst system 100 may be provided with a metal pipe 23 for housing the catalyst support 10 and the coil 19 via an inorganic mat material 22.

In the induction heating catalyst system 100, the magnetic bodies generate heat in response to a change in the magnetic field corresponding to the alternating current flowing through the coil, and the heat increases the temperature of the catalyst support, thereby increasing the temperature of the catalyst and promoting the catalytic reaction, and depending on the type of the catalyst, carbon monoxide (CO), nitride oxides ($NO_x$) and hydrocarbons (CH) are oxidized or reduced to carbon dioxide ($CO_2$), nitrogen ($N_2$) and water ($H_2O$). Such a function is exerted to purify an exhaust gas passing through the catalyst support. As described above, the catalyst support of the induction heating catalyst system 100 has the region A where the catalyst is not supported, at least on the end face side on the inlet side in the gas flow direction. The end face of the catalyst support on the inlet side in the gas flow direction is a lower temperature region, where the catalyst is difficult to reach any sufficient activation temperature. Therefore, by using the lower temperature region as the region A where the catalyst is not supported, the catalyst can be effectively utilized without waste during induction heating, and an amount of catalyst used can be reduced, so that production costs for the induction heated catalyst system 100 will be reduced.

EXAMPLES

Hereinafter, Examples are provided to better illustrate the invention and its advantages. However, the present invention is not limited to Examples.

Example 1

Figure 9:
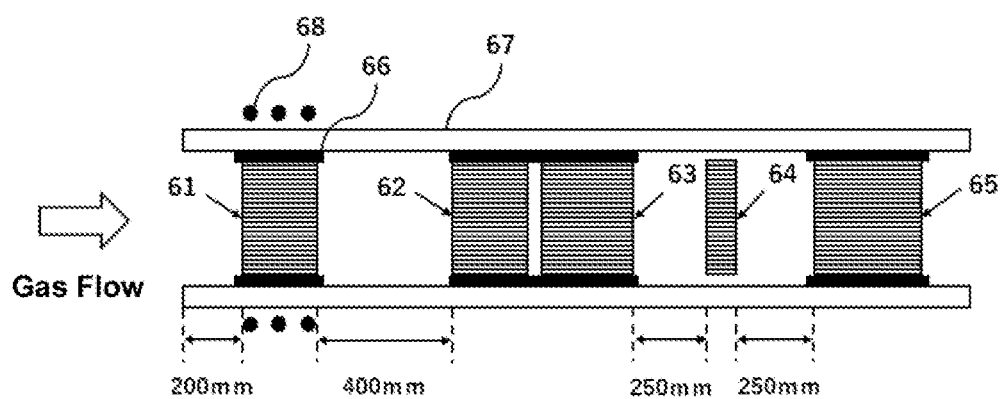
FIG. 9 is a schematic cross-sectional view of an induction heating catalyst system in Example, which is parallel to a gas flow direction.

FIG. 9 shows a schematic cross-sectional view of the induction heating catalyst system prepared in Example 1, which is parallel to the gas flow direction. In FIG. 9, the "SCR" represents a selective reduction catalyst, the "DOC" represent an oxidation catalyst, the "DPF" represents a diesel particulate filter, the "CC-" means that an object is directly under an engine, and the "UF" represents underfloor.

As shown in FIG. 9, conditions for arranging the catalyst support when performing the simulation were such that CC-SCR 61 was arranged at a position that was separated by 200 mm in the gas flow direction from an inlet of the metal pipe 67 that would be an flow path for an exhaust gas from a diesel engine, DOC62/DPF63 was arranged at a position that was separated by 400 mm from the CC-SCR 61, a mixer 64 is arranged at a position that was separated by 250 mm from the DPF 63, and UF-SCR 65 was arranged at a position that was separated by 250 mm from the mixer 64.

The CC-SCR was under conditions where 200 g/L of the SCR catalyst was supported into cells of a cordierite support (a diameter of 267 mm, a rib thickness of 0.076 mm, a cell density of 93 cells/cm) having a length of 152.4 mm in the extending direction of the cells. In Example 1, the region where the SCR catalyst was provided was the region of 50 mm inward from the end face of the cordierite support on the outlet side in the gas flow direction in the cell (the downstream 50 mm region). That is, the region from the end face of the cordierite support on the inlet side in the gas flow direction to 102.4 mm was the region A where the catalyst was not supported. The region A is the position from the end face on the inlet side of the cordierite support to 67% of the length of the cordierite support. Also, the CC-SCR according to Example 1 has cells filled with the magnetic bodies from the end face on the inlet side to the end face on the outlet side in the gas flow direction of the cordierite support. For conditions for the magnetic bodies, Fe—Cr particles having a diameter of 20 μm and glass were mixed at a ratio of Fe—Cr particles:glass=8:2 on a volume basis, and 100 g/L of the mixture was arranged.

Using the induction heating catalyst system having such a structure, $NO_x$ emissions during the initial 500 seconds (electric power: 30 kW) of the U.S. emission regulation operation mode (FTP) as an example of the application of a diesel engine (10 L displacement) to the CC-SCR were simulated using analysis software: Exothermia suite 2019.2, under the following initial conditions, energization conditions, and fed exhaust gas conditions.

<Initial Conditions>
 Temperature of honeycomb structure: 300K;
 Initial ammonia storage amount: 0 g/L for both CC-SCR and UF-SCR;
<Energization Conditions>
 Dielectric heating method: heat quantity equivalent to 30 kW of dielectric heating was uniformly applied to the whole CC-SCR area;
 Energization time: 500 seconds from the start of FTP traveling mode;
<Fed Exhaust Gas Conditions>
 $NH_3$ concentration: fed in 0 to 500 seconds so that it was 1.5 times the $NO_x$ concentration of the inlet gas.

Comparative Example 1

Comparative Example 1 carried out a simulation under the same conditions as those of Example 1, with the exception that the CC-SCR catalyst arrangement region was provided over the whole area from the end face on the inlet side to the end face on the outlet side in the gas flow direction of the cordierite support.

Reference Example 1: Reference Value

Reference Example 1 had the same configuration as that of Comparative Example 1, with the exception that no magnetic body was arranged in the CC-SCR, no coil was provided around the CC-SCR, and no induction heating was performed. The $NO_x$ emission of Reference Example 1 having such a configuration was defined as a reference value of 100%.

Table 1 shows the above test conditions and simulation results. It should be noted that the $NO_x$ emission (relative value %) of each of Example 1 and Comparative Example 1 in Table 1 show a relative value to the reference value of Reference Example 1, which is 100%.

direction could be satisfactorily suppressed, and the deterioration of the exhaust gas purification performance could be suppressed. Further, it is believed that Example 1 does not support the catalyst in the region in the vicinity of the inlet in the gas flow direction of the CC-SCR where the temperature increase is insufficient, so that the catalyst can be effectively utilized without waste during induction heating.

Example 2

As Example 2, in contrast to Example 1, a region in the gas flow direction of the cordierite support of the CC-SCR was divided into two equal parts by the same distance in the upstream and downstream sides, and the same magnetic bodies and coil as those of Example 1 were provided only in the upstream side, and the catalyst was supported only on the downstream side.

That is, the cordierite support according to Example 2 is the same as the cordierite support according to Example 1, and the length of each cell in the extending direction is 152.4 mm. Further, the length of the downstream catalyst arrangement region in the extending direction of the cells is 76.2 mm. The region A where the magnetic bodies are arranged in the gas flow direction is arranged from the end face on the inlet side in the gas flow direction of the cordierite support to the position of 50% of the length of the cordierite support. Thus, in the cordierite support of the CC-SCR according to Example 2 in the gas flow direction, there is no portion a where the region provided with the catalyst and the region provided with the magnetic bodies overlap with each other.

Also, the electric power for induction heating was 10 kW. The simulation was performed under the same conditions as those of Example 1 except for the above matters.

Example 3

Example 3 carried out a simulation under the same conditions as those of Example 2, with the exception that, in the gas flow direction of the cordierite support of the CC-SCR, the region provided with the magnetic bodies and the coil was extended by 22.9 mm to the catalyst arrangement region, and a portion a where the catalyst arrangement region and the region provided with the magnetic bodies overlapped with each other was 30% of the whole catalyst

TABLE 1

| | Magnetic Body Arrangement | Magnetic Body Amount (g) | Catalyst Amount (g) | Catalyst Arrangement | Electric Power × Time | $NO_x$ Emission |
|---|---|---|---|---|---|---|
| Reference Example 1 | No | No | 1702 | SCR Whole Area | No | 100% Reference Value |
| Comparative Example 1 | SCR Whole Area | 851 | 1702 | SCR Whole Area | 30 kW × 500 s | 51% Relative Value |
| Example 1 | SCR Whole Area | 851 | 1702 | SCR DownStream 50 mm | 30 kW × 500 s | 36% Relative Value |

As shown in Table 1, it is believed that in contrast to Comparative Example 1 in which the catalyst was provided over the whole area of CC-SCR, Example 1 provided the catalyst only in the 50 mm area downstream of the CC-SCR, so that the adsorption of $NH_3$ on the inlet side in the gas flow arrangement region. In this case, the region A where the magnetic bodies are arranged in the gas flow direction is arranged from the end face of the cordierite support on the inlet side in the gas flow direction to a position of 65% of the length of the cordierite support.

Example 4

Example 4 carried out a simulation under the same conditions as those of Example 2, with the exception that, in the gas flow direction of the cordierite support of the CC-SCR, the region provided with the magnetic bodies and the coil was extended by 38.1 mm to the catalyst arrangement region, and a portion a where the catalyst arrangement region and the region provided with the magnetic bodies overlapped with each other was 50% of the whole catalyst arrangement region. In this case, the region A where the magnetic bodies are arranged in the gas flow direction is arranged from the end face of the cordierite support on the inlet side in the gas flow direction to a position of 75% of the length of the cordierite support.

Example 5

Example 5 carried out a simulation under the same conditions as those of Example 2, with the exception that, in the gas flow direction of the cordierite support of the CC-SCR, the region provided with the magnetic bodies and the coil was extended by 60.96 mm to the catalyst arrangement region, and a portion a where the catalyst arrangement region and the region provided with the magnetic bodies overlapped with each other was 80% of the whole catalyst arrangement region. In this case, the region A where the magnetic bodies are arranged in the gas flow direction is arranged from the end face of the cordierite support on the inlet side in the gas flow direction to a position of 90% of the length of the cordierite support.

Table 2 shows the above test conditions and simulation results. The $NO_x$ emission (relative value %) of each of Examples 2 to 5 in Table 2 show a relative value to the reference value of Reference Example 1, which is 100%.

TABLE 2

| | Example 1 ($\alpha$ = 100) | Example 2 ($\alpha$ = 0) | Example 3 ($\alpha$ = 30%) | Example 4 ($\alpha$ = 50%) | Example 5 ($\alpha$ = 80%) |
|---|---|---|---|---|---|
| $NO_x$ Emission | 36% Relative Value | 42% Relative Value | 38% Relative Value | 37% Relative Value | 36.50% Relative Value |

As shown in Table 2, it was found that a larger portion a where the region provided with the catalyst and the region provided with the magnetic bodies overlapped with each other could result in better catalyst heating, so that the exhaust gas purification performance could be improved.

DESCRIPTION OF REFERENCE NUMERALS 10, 20, 30, 40, 50 catalyst support
11, 21, 31, 41, 51 honeycomb structure
12 catalyst
13 cell
14 outer peripheral wall
15 partition wall
16 pillar shaped honeycomb structure portion
17 magnetic body
18 surface layer
19 coil
22 inorganic mat material
23 metal pipe
61 CC-SCR
62 DOC
63 DPF
64 mixer
65 UF-SCR
66 inorganic mat material
67 metal pipe
68 coil
100 induction heating catalyst system

The invention claimed is:

1. A catalyst support for induction heating, comprising:
a honeycomb structure comprising a pillar shaped honeycomb structure portion having: an outer peripheral wall; and a partition wall disposed on an inner side of the outer peripheral wall, the partition wall defining a plurality of cells, each of the cells extending from an end face on an inlet side to an end face on an outlet side in a gas flow direction to form a flow path;
a catalyst supported onto an interior of the partition wall; and
at least one magnetic body provided within the honeycomb structure,
wherein the catalyst support has a region A where the catalyst is not supported, at least on the end face side of the catalyst support on the inlet side in the gas flow direction,
wherein the magnetic body is arranged at least in the region A in the gas flow direction, and
wherein the magnetic body is ring-shaped, and the ring-shaped magnetic body is embedded in at least one groove provided in the end face of the catalyst support on the inlet side in the gas flow direction.

2. The catalyst support for induction heating according to claim 1, wherein the region A is arranged from the end face on the inlet side in the gas flow direction of the catalyst support to a position of 10% to 70% of the length of the catalyst support.

3. The catalyst support for induction heating according to claim 1, wherein the catalyst support has a portion where a region supporting the catalyst and a region provided with the magnetic body overlap with each other, in the gas flow direction.

4. The catalyst support for induction heating according to claim 1, wherein a surface layer comprising the magnetic body is provided on the partition wall.

5. The catalyst support for induction heating according to claim 1, wherein the catalyst is an SCR catalyst.

6. The catalyst support for induction heating according to claim 1, wherein the magnetic body comprises dispersed magnetic powder.

7. An induction heating catalyst system comprising: the catalyst support for induction heating according to claim 1; and a coil provided on an outer circumference of the catalyst support.

8. The induction heating catalyst system according to claim 7, wherein the coil is provided at a position corresponding to the region provided with the magnetic body in the gas flow direction of the catalyst support.

* * * * *